United States Patent
Ishida (10) Patent No.: US 7,222,879 B2
(45) Date of Patent: May 29, 2007

(54) SEATING CONDITION DETECTING SYSTEM FOR VEHICLE

(75) Inventor: Shoichi Ishida, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/158,929

(22) Filed: Jun. 3, 2002

(65) Prior Publication Data
US 2003/0001749 A1   Jan. 2, 2003

(30) Foreign Application Priority Data
Jun. 27, 2001 (JP) .............................. 2001-193938
Mar. 4, 2002 (JP) .............................. 2002-057025

(51) Int. Cl.
*B60R 21/16* (2006.01)
(52) U.S. Cl. ..................... 280/735; 180/273
(58) Field of Classification Search ................ 701/45; 180/273; 280/735
See application file for complete search history.

(56) References Cited

U.S. PATENT DOCUMENTS

| | | | | |
|---|---|---|---|---|
| 5,143,386 A * | 9/1992 | Uriarte | ....................... | 254/418 |
| 5,270,930 A * | 12/1993 | Ito et al. | ....................... | 701/69 |
| 5,706,196 A * | 1/1998 | Romstadt | ....................... | 701/37 |
| 6,467,804 B2 * | 10/2002 | Sakai et al. | ................... | 280/735 |
| 6,536,797 B1 * | 3/2003 | Reich | ........................ | 280/735 |
| 6,546,817 B1 | 4/2003 | Aoki | | |
| 6,557,424 B1 * | 5/2003 | Morell | ................... | 73/862.045 |
| 6,561,300 B1 * | 5/2003 | Sakamoto et al. | .......... | 180/273 |
| 6,578,870 B2 * | 6/2003 | Winkler et al. | ............. | 280/735 |
| 6,810,984 B2 * | 11/2004 | Sakai et al. | ................. | 180/273 |
| 6,817,254 B2 | 11/2004 | Aoki | | |
| 2004/0016577 A1 * | 1/2004 | Lichtinger et al. | .......... | 177/144 |

FOREIGN PATENT DOCUMENTS

JP    A-2002-293181    10/2002

OTHER PUBLICATIONS

Notice of Rejection/Communication from Japanese Patent Office in Japanese application No. 2001-057025 which is a counterpart Japanese application of U.S. Appl. No. 10/158,929 (English translation attached) mailed on Aug. 24, 2005.

* cited by examiner

*Primary Examiner*—Troy Chambers
(74) *Attorney, Agent, or Firm*—Posz Law Group, PLC (57) ABSTRACT

A seating condition detecting system has four load sensors, a belt tension sensor and a self-diagnostic system. The first and second abnormal ranges are set for detecting abnormal operations of the system. The upper limit of the first range is set so that a total load becomes heavier as a belt tension becomes higher. The lower limit of the second range is set so that the total load becomes heavier as the belt tension deviates from the point at which the total load becomes lightest. When the total load falls in the first range or the second range, an abnormal operation of the seating condition detecting system is determined.

11 Claims, 6 Drawing Sheets

SEATING CONDITION DETECTING SYSTEM FOR VEHICLE

CROSS REFERENCE TO RELATED APPLICATION

This application is based on and incorporates herein by reference Japanese Patent Applications No. 2001-193938 filed on Jun. 27, 2001 and No. 2002-57025 filed on Mar. 4, 2002.

FIELD OF THE INVENTION

The present invention relates to a seating condition detecting system for a vehicle.

BACKGROUND OF THE INVENTION

In recent years, the performance and function of vehicle airbags have been improving as attention to the safety of vehicles increases. It is desired to standardize a system that detects seating conditions of a vehicle occupant and controls airbag inflation based on the detected condition. The seating conditions include seating position and posture of the occupant.

A seating condition detecting system has load sensors and a seating condition detecting unit. The load sensors detect loads on springs that support a seat at four positions, right front, left front, right rear and left rear, from underneath. The seating condition detecting unit detects a seating condition of a vehicle occupant based on the loads measured by the load sensors.

However, if the seating condition of the vehicle occupant is not properly determined, the airbag cannot be appropriately inflated for the occupant.

SUMMARY OF THE INVENTION

The present invention therefore has an objective to provide a seating condition detecting system with a self-diagnostic function of determining normal or abnormal operations of the system so that an airbag is appropriately inflated.

In a vehicle, a seat is supported on four elastic bodies, such as springs, located at right front (RF), left front (LF), right rear (RR) and left rear (LR) underneath the seat. The seating condition detecting system of the present invention has four load sensors to detect loads to which the elastic bodies are subjected. Each sensor is exclusively used for load detection of each elastic body. For instance, the right front (RF) load sensor detects a load to which the RF elastic body is subjected. The seating condition detecting system determines a seating condition of vehicle occupant based on the loads detected by the load sensors.

If the load sensors operate properly, the loads detected by the load sensors are equal to or greater than 0 whether the occupant is seated. Therefore, if one of the detected loads is negative and its absolute value is equal to or greater than a predetermined value, the operation of the system is determined as abnormal. To make this determination, the self-diagnostic function is used. The abnormal operation may be caused in the following conditions:

The load to which the elastic body is subjected cannot be properly detected due to the defective sensor that detects the load.
A harness of the vehicle is jammed.
The seat has a structural strain.
Some kind of object is stuck under the seat or in spaces existing sides of the seat.
A force is exerted on the seat from the side.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to various embodiments that has the same construction shown in FIGS. 1 and 2.

[First Embodiment]

Figure 1:
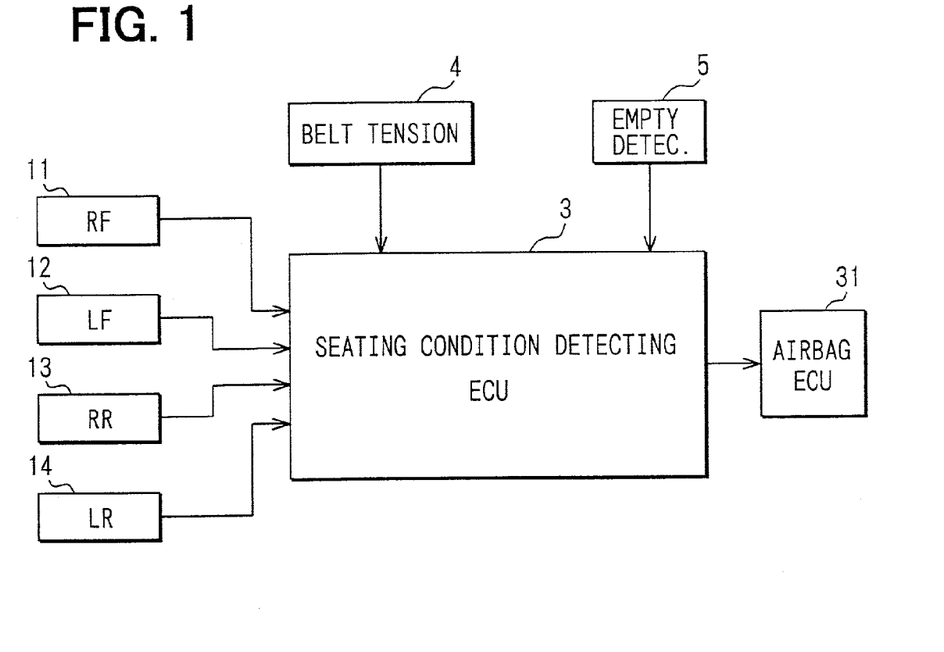
FIG. 1 is a block diagram showing a seating condition detecting system according to the first to the seventh embodiments of the present invention.
Figure 2:
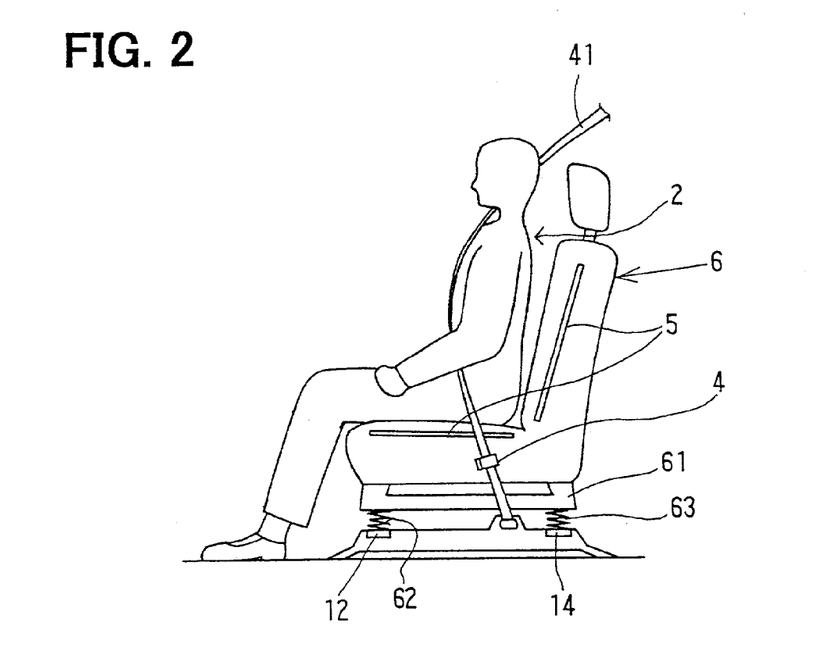
FIG. 2 is an explanatory schematic view showing a vehicular seat on which a vehicle occupant is seated.

Referring to FIGS. 1 and 2, a seating condition detecting system has a right front (RF) load sensor 11, a left front (LF) load sensor 12, a right rear (RR) load sensor 13, a left rear (LR) load sensor 14, a seating condition detecting ECU (electronic control unit) 3, and a belt tension sensor 4. The belt tension sensor detects belt tension of a seat belt 41 that restrains the occupant 2 or secures the child seat.

The RF load sensor 11 detects a load to which a right front (RF) elastic body (spring) is subjected. The spring supports a seat frame 61 from underneath at right front. The LF load sensor 12 detects a load to which a left front (LF) elastic body (spring 62) is subjected. The spring 62 supports a seat frame 61 from underneath at left front. The right rear (RR) load sensor 13 detects a load to which a right rear (RR) elastic body (spring) is subjected. The spring supports the seat frame 61 from underneath at right rear. The left rear (LR) load sensor 14 detects a load to which a left rear (LR) elastic body (spring 63) is subjected. The spring 63 supports the seat frame 61 from underneath at left rear.

A seating condition determination program is stored in the seating condition detecting ECU 3. That is, this ECU 3 is programmed to determine a seating condition of a vehicle occupant 2 based on the loads detected by the load sensors by executing the determination program. The seating conditions to be determined are as follows:

The occupant 2 is seated in the center of the seat 6, or off center toward the right or left.

The occupant 2 is seated in the center of the seat 6, seated off center toward the front, leaning back or reclining on the seat 6.

The occupant 2 is an infant (in a child seat), a child or an adult.

The occupant 2 is heavy or light.

A self-diagnostic program is stored in the ECU 3. The ECU 3 is thus programmed to determine whether the operation of the system is normal. An airbag ECU 31 controls inflation of the airbag, stored in a storage space of steering wheel or dashboard, at a vehicle collision. This control is performed based on the seating condition of the occupant 2 immediately before the collision detected by the ECU 3.

Figure 3:
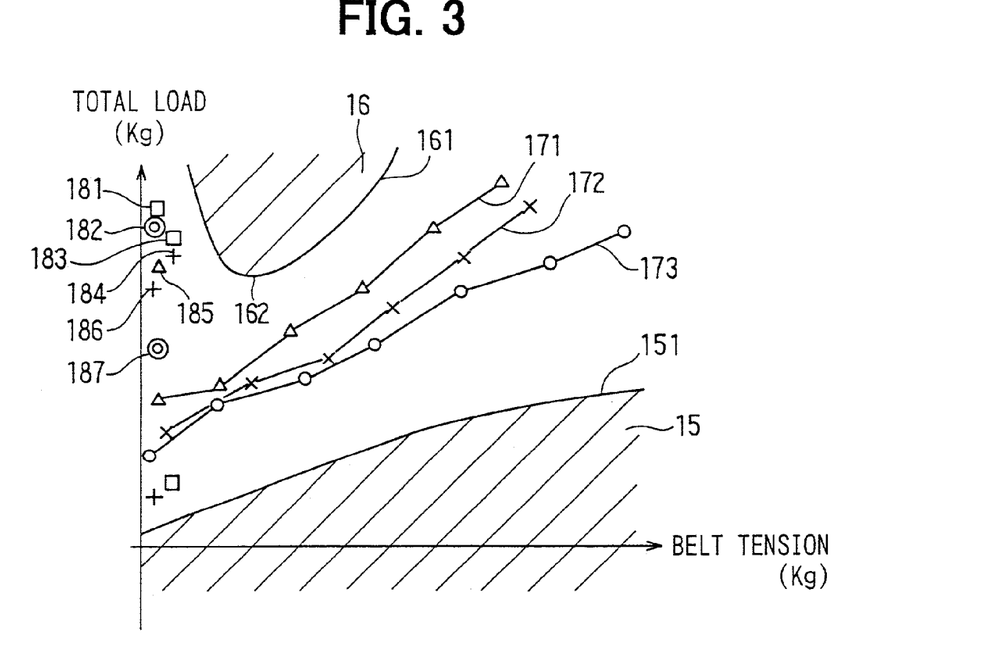
FIG. 3 is a graph showing belt tension vs. total loads with normal and abnormal ranges indicated with shaded areas according to the first embodiment.

In the first embodiment, the self-diagnostic program detects an abnormal operation of the seating condition detecting system when the total of loads detected by the load sensors 11 to 14 falls into the first abnormal range (too light load range) 15 or the second abnormal range (too heavy load range) 16 shown in FIG. 3. When a child seat is mounted on the seat 6, the total load increases as the tightness of the child seat mounting (belt tension) increases. This is true for any kind of child seat as long as the belt tension sensor 4 and all load sensors operate normally. The normal relationship between the total load and belt tension is indicated with characteristic curves 171, 172 and 173. Those curves indicate the load total in different experiment settings against the belt tension.

The first abnormal range 15 is set so that the upper limit 151 of the range 15 becomes higher as the belt tension increases. When the total load falls into the first abnormal range 15, the program determines the operation of the system as abnormal.

When the occupant 2 wears the seat belt 41, the belt tension is low, as indicated with data points 181 to 187 in FIG. 3. Different kinds of marks indicate the total load in different experimental settings. The second abnormal range 16 is set so that the lower limit 161 of the range 16 also becomes higher as the belt tension deviates from the point 162 at which the total load becomes lightest. When the total load and belt tension are within the range 16, the program determines the operation of the system as abnormal.

The abnormal operation of the system may be caused in the following conditions:

The load to which the elastic body 62, 63 is subjected cannot be properly detected because the seat belt 41 or one or more load sensors 11 to 14 are defective.

The belt tension cannot be properly detected because the belt tension sensor 4 is defective.

A harness of the vehicle is jammed.

The seat 6 has a structural strain.

Some kind of object is stuck under the seat 6 or in spaces existing sides of the seat 6.

A force is exerted on the seat 6 from the side.

If the system operates abnormally, an airbag cannot be inflated appropriately for the occupant 2. Since the system detects its abnormal operation with the self-diagnostic function, the inappropriate airbag inflation can be reduced.

[Second Embodiment]

Figure 4:
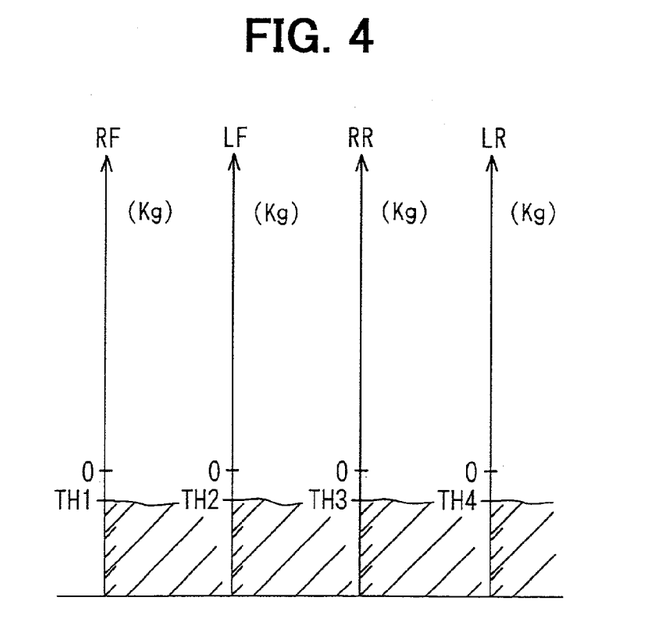
FIG. 4 is a graph showing abnormal ranges for loads that each load sensor detects according to the second embodiment of the present invention.

The second embodiment has the same construction as the first embodiment. However, the ECU 3 is programmed to determine an abnormal operation of the system when at least one of the detected loads is less than a negative threshold TH1, TH2, TH3 or TH4. The negative threshold is set for each load value detected by each load sensor 11 to 14 as shown in FIG. 4.

The negative threshold is used is because if the load sensors operate properly, the loads detected by the load sensors are equal to or heavier than 0 whether the occupant is seated. When the detected loads become negative, it is considered that a vehicular seat is lifted for some reason, for instance, some substance is stuck underneath the seat.

The load sensors 11 to 14 are configured so that loads in both negative value (tensile loads) and positive value can be detected. For instance, the output voltage of the sensor is set to 2.5 V when a load is equal to 0 kg. If the voltage varies between 0 V and 5 V, the voltage becomes 5 V at the heaviest load in the positive value range and 0 V at the lightest load in the negative value range.

The abnormal operation of the system may be caused in the following conditions:

The load to which the elastic body 62, 63 is subjected cannot be properly detected because the load sensor 11 to 14 that has detected the load less than the threshold.

A harness of the vehicle is jammed.

The seat 6 has a structural strain.

Some kind of object is stuck under the seat 6 or in spaces existing sides of the seat 6.

A force is exerted on the seat 6 from the side.

[Third Embodiment]

The third embodiment has the same construction as the first embodiment. However, the ECU 3 is programmed to determine the seating condition that includes properness and a sitting posture of the occupant 2. The sitting posture means that the occupant 2 is seated off center toward the front or back, or reclining on the seat 6. These conditions are determined by calculating differences between the detected loads as shown in FIGS. 5 and 6.

With its self-diagnostic program, the ECU 3 determines the seating condition of the occupant 2 by subtracting the LF load from the RF load and the RL load from the RR load.

Figure 5:
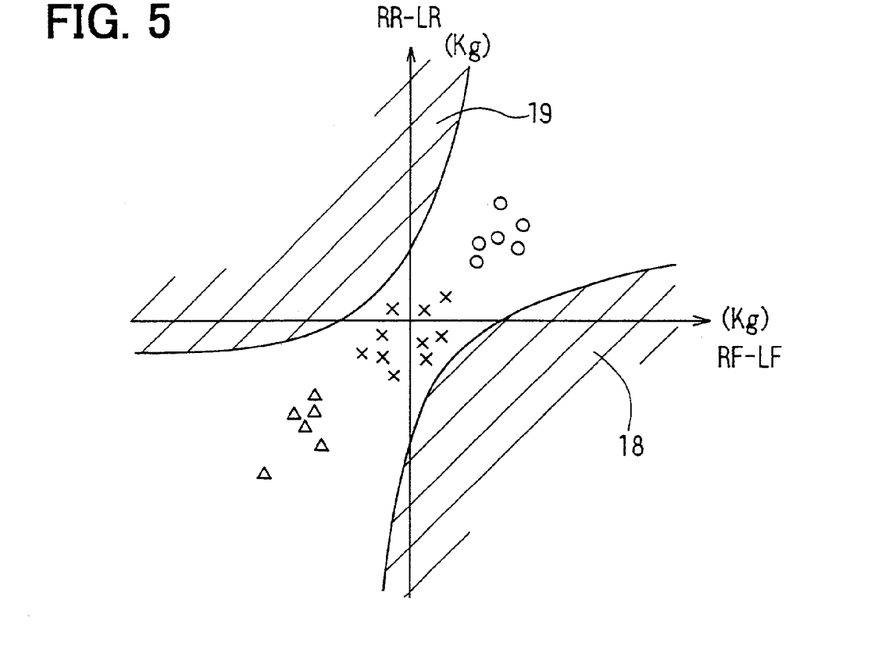
FIG. 5 is a graph showing a difference between loads with normal and abnormal ranges indicated according to the third embodiment.
Figure 6:
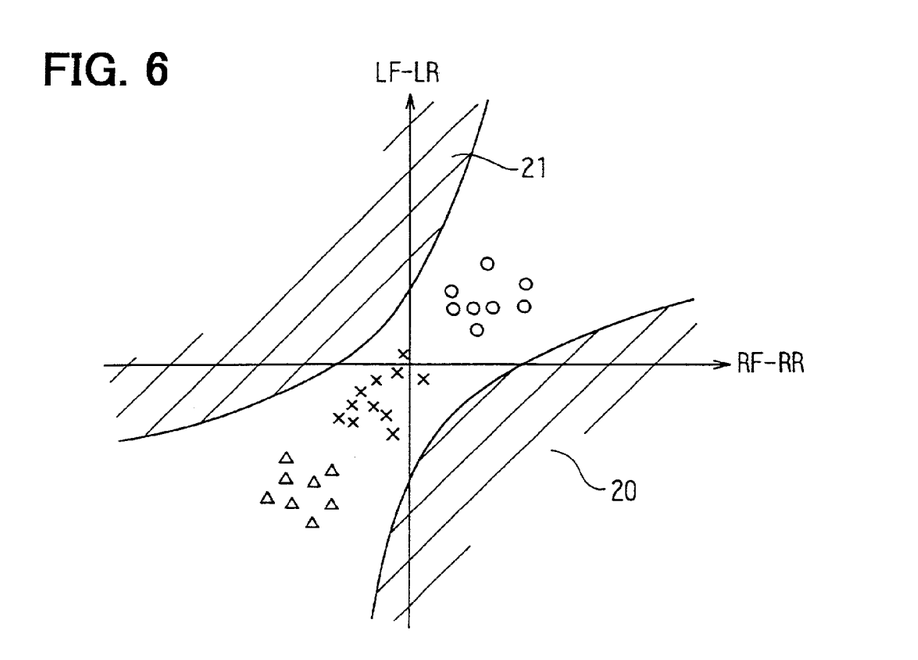
FIG. 6 is a graph showing a difference between loads with normal and abnormal ranges, indicated as shaded areas, according to the third embodiment.

Abnormal ranges 18 and 19 are set as shown in FIG. 5. The abnormal range 18 is set around a range of RF−LF$\geq$0 and RR−LR$\leq$0. If RF−LF$\geq$0, the seating condition is determined as off-center toward the right. If RR−LR$\leq$0, the seating condition is determined as off-center toward the left. Therefore, these two results contradict each other.

The abnormal range 19 is set around a range of RF−LF$\leq$0 and RR−LR$\geq$0. If RF−LF$\leq$0, the seating condition is determined as off-center toward the left. If RR−LR$\geq$0, the seating condition is determined as off-center toward the right. Therefore, these two results contradict each other.

Abnormal ranges 20 and 21 are set as shown in FIG. 6. The abnormal range 20 is set around a range of RF−RR$\geq$0 and LF−LR$\geq$0. If RF−RR$\geq$0, the seating condition is determined as off-center toward the front. If LF−LR$\leq$0, the seating condition is determined as leaning back or reclining. Therefore, these two results contradict each other.

The abnormal range 21 is set around a range of RF−RR≦0 and LF−LR≧0. If RF−RR≦0, the seating condition is determined as leaning back or reclining. If LF−LR≧0, the seating condition is determined as off-center toward the front. Therefore, these two results contradict each other.

The abnormal operation may be caused in the following conditions:
- The loads to which the elastic body 62, 63 are subjected cannot be properly detected because at least one of the load sensors 11 to 14 is defective.
- A harness of the vehicle is stuck.
- The seat 6 has a structural strain.
- Some kind of object is stuck under the seat 6 or in spaces exist sides of the seat 6.
- A force is exerted on the seat 6 from the side.

[Fourth Embodiment]

Figure 7:
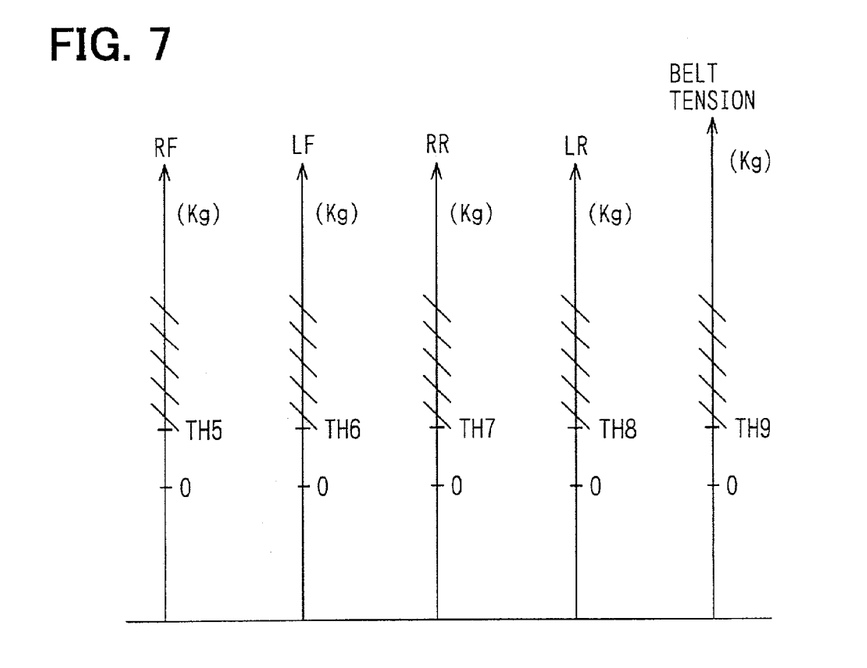
FIG. 7 is a graph showing thresholds and abnormal ranges, indicated as shaded areas, for loads detected by load sensors and for belt tension detected by a belt tension sensor according to the fourth and fifth embodiments.

The fourth embodiment includes an empty seat detecting sensor 5 in addition to the construction of the first embodiment. The ECU 3 is programmed to determine an abnormal operation of the system. The abnormal operation is determined when one of the loads detected is heavier than a threshold TH5, TH6, TH7 or TH8 although an empty seat is detected by the empty seat sensor 5. The thresholds TH5 to TH8 are set for each load value detected by each load sensor 11 to 14 as shown in FIG. 7.

The abnormal operation of the system may be caused in the following conditions:
- The belt tension cannot be properly detected because the belt tension sensor 4 is defective
- The seating condition of the occupant 2 cannot be detected because the empty seat detecting sensor 5 is defective.
- The belt tension sensor 4 and empty seat detecting sensor 5 are both defective.
- A vehicular harness is disconnected or stuck.
- The seat 6 has a structural strain.
- Some kind of object is stuck under the seat 6 or in spaces exist sides of the seat 6.
- A force is exerted on the seat 6 from the side.

[Fifth Embodiment]

The fifth embodiment has the same construction as the fourth embodiment. However, the ECU 3 is programmed to determine an abnormal operation of the system when belt tension is higher than a threshold TH9 in FIG. 7 although an empty seat is detected.

The abnormal operation of the system may be caused in the following conditions:
- The belt tension cannot be properly detected because the belt tension sensor 4 is defective.
- The seating condition of the occupant 2 cannot be detected because the empty seat detecting sensor 5 is defective.
- The belt tension sensor 4 and empty seat detecting sensor 5 are both defective.
- A harness of the vehicle is disconnected.

[Sixth Embodiment]

Figure 9:
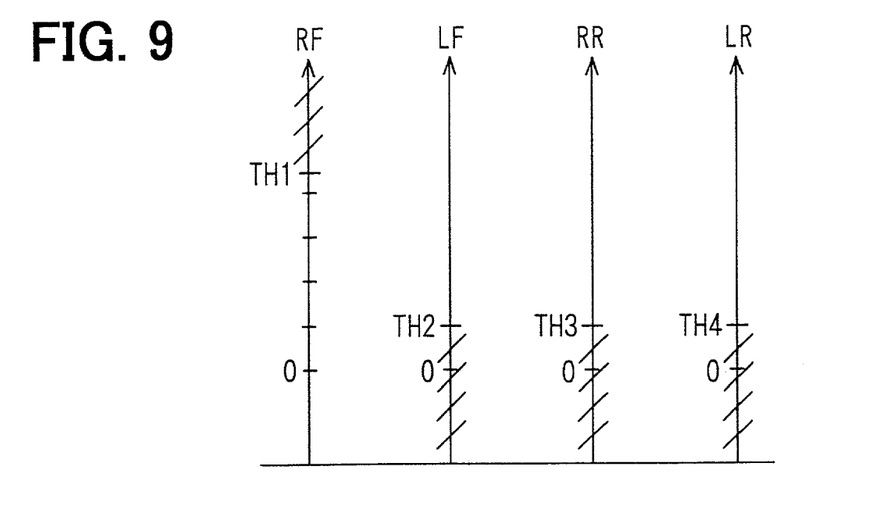
FIG. 9 is a graph showing thresholds and abnormal ranges, indicated as shaded areas, for loads detected by load sensors according to the sixth embodiment.
Figure 10:
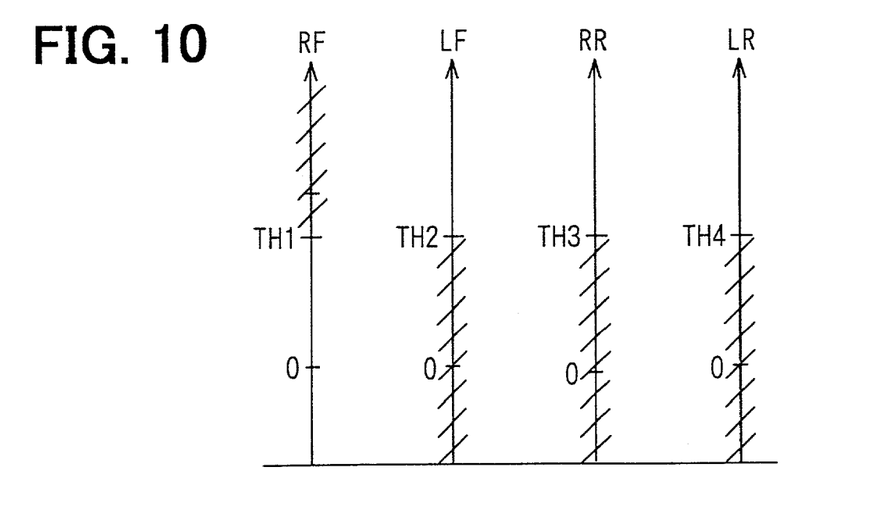
FIG. 10 is a graph showing thresholds and abnormal ranges, indicated as shaded areas, for loads detected by load sensors according to a modification of the sixth embodiment.

Regarding the seating condition detecting system according to the second embodiment, the self-diagnosis operation can be modified by setting the thresholds TH1 to TH4 in a different way as shown in FIGS. 9 and 10. In an example shown in FIG. 9, when any three of the load sensors 11 to 14 have detected loads less than 20 kg (for instance, TH2 to TH4) and the remaining one sensor has detected a load more than 40 kg (for instance, TH1), the ECU 3 determines the operation of the system as abnormal. The outputs of the load sensors 11 to 14 may saturate and become full-scale. The abnormal operation may be caused in the following conditions:
- The load to which the spring 62, 63 is subjected cannot be properly detected because the RF load sensor 11, which has detected the load more than 40 kg, is defective.
- A harness of the vehicle is jammed.
- The seat 6 has a structural strain.
- Some kind of object is stuck under the seat 6 or in spaces exist sides of the seat 6.
- A force is exerted on the seat 6 form the side.

In another example shown in FIG. 10, when any three of the load sensors 11 to 14 have detected loads less than 30 kg (for instance, TH2 to TH4) and the remaining one sensor has detected a load more than 30 kg (for instance, TH1) as shown in FIG. 10, the ECU 3 determines the operation of the system as abnormal.

[Seventh Embodiment]

Figure 11:
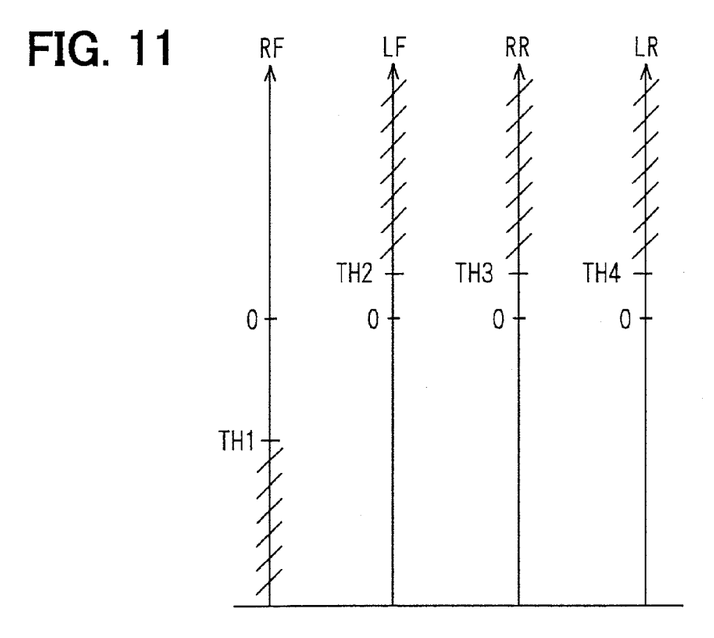
FIG. 11 is a graph showing thresholds and abnormal ranges, indicated as shaded areas, for loads detected by load sensors according to the seventh embodiment.
Figure 12:
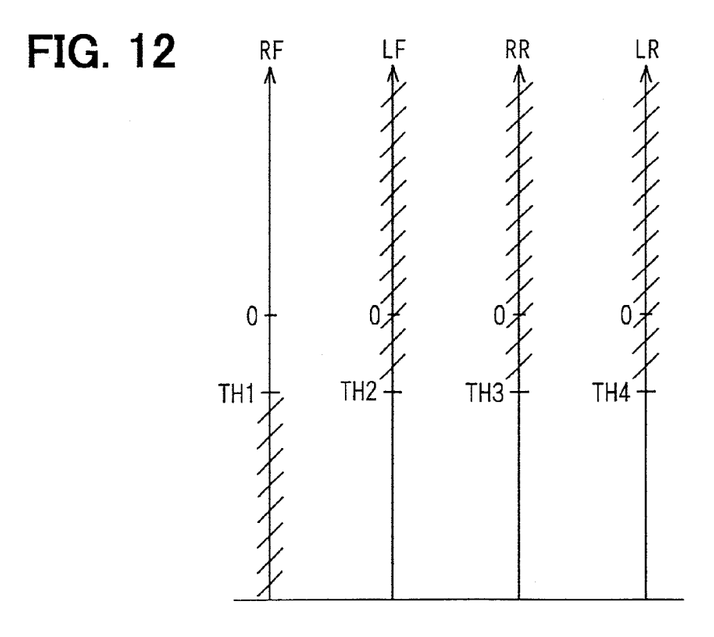
FIG. 12 is a graph showing thresholds and abnormal ranges, indicated as shaded areas, for loads detected by load sensors according to a modification of the seventh embodiment.

Regarding the seating condition detecting system according to the second embodiment, the self-diagnosis operation can be modified by setting the thresholds TH1 to TH4 in different ways as shown in FIGS. 11 and 12. In an example shown in FIG. 11, when any three of the load sensors 11 to 14 have detected loads more than 10 kg (for instance, TH2 to TH4) and the remaining one sensor has detected a load less than −30 kg (for instance, TH1), the ECU 3 determines the operation of the system as abnormal. The outputs of the load sensors 11 to 14 may saturate and become full-scale. The abnormal operation may be caused in the following conditions:
- The load to which the spring 62, 63 is subjected cannot be properly detected because the RF load sensor 11, which has detected the load less than −30 kg, is defective.
- A harness of the vehicle is stuck.
- The seat has a structural defect.
- Some kind of object is stuck under the seat 6 or in spaces exist sides of the seat 6.
- A force is exerted on the seat from the side.

In another example shown in FIG. 12, when any three of the load sensors 11 to 14 have detected loads more than −10 kg (for instance, TH2 to TH4) and the remaining one sensor has detected a load less than −10 kg (for instance, TH1), the program determines the operation of the system as abnormal.

Figure 8:
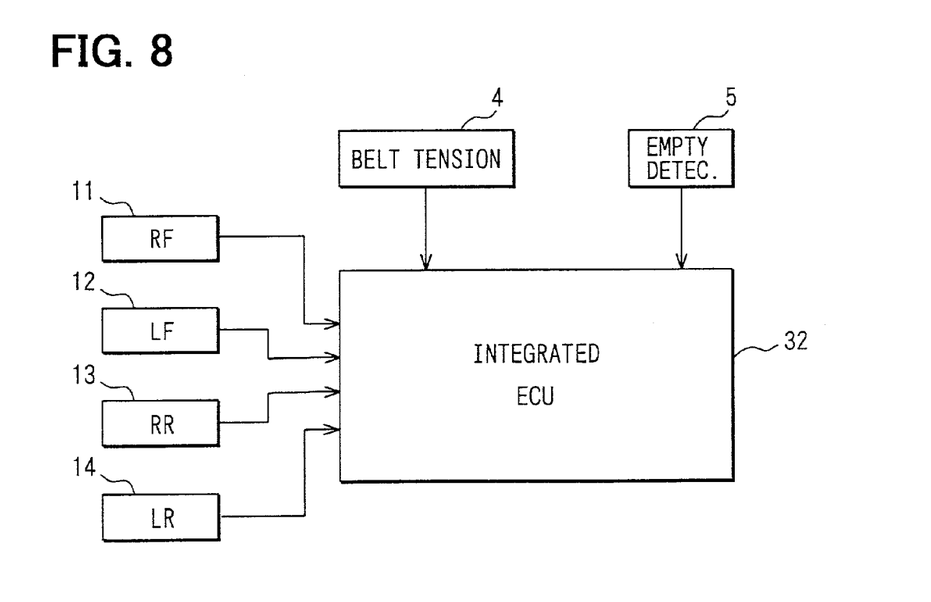
FIG. 8 is a block diagram showing a seating condition detecting system that has an integrated ECU where the seating condition detecting ECU and airbag ECU are integrated according to modifications of the first to the seventh embodiments.

The present invention should not be limited to the embodiment previously discussed and shown in the figures, but may be implemented in various ways without departing from the spirit of the invention. As shown in FIG. 8, an integrated ECU 32, in which the seating condition detecting ECU 3 and airbag ECU 31 are integrated, can be used. When the abnormal operation of seating condition detecting system is detected, a warning can be provided to prompt a user to have the system for service or to stop improper operation. The warning may be provided with a buzzer or light.

What is claimed is:

1. A seating condition detecting system comprising:
a right front load sensor for detecting a load to which a right front elastic body that supports a right front part of a seat from underneath is subjected;
a left front load sensor for detecting a load to which a left front elastic body that supports a left front part of the seat from underneath is subjected;
a right rear load sensor for detecting a load to which a right rear elastic body that supports a right rear part of the seat from underneath is subjected;

a left rear load sensor for detecting a load to which a left rear elastic body that supports a left rear part of the seat from underneath is subjected;

a seating condition detecting means for detecting a seating condition of a vehicle occupant based on the loads detected by the load sensors; and self-diagnostic means for determining an abnormal operation in the seating condition detection based on calculated differences between detected loads of predetermined sensor pairs, the self-diagnostic means including:

means for calculating differences between the detected right front load and the detected left front load, and between the detected right rear load and the detected left rear load, both indicating seating position of the vehicular occupant either rightward or leftward, and for determining whether the differences contradict each other, or means for calculating differences between the detected right front load and the detected right rear load, and between the detected left front load and the detected left rear load, both indicating seating position of the vehicular occupant either forward or backward, and for determining whether the differences contradict each other.

2. The seating condition detecting system according to claim 1, wherein:

the difference between the right front load and the left front load by a subtraction between the right front load and the left front load;

the difference between the right rear load and the left rear load is calculated by a subtraction between the right rear load and the left rear load; and the self-diagnostic means determines the abnormal operation when results of the subtraction of the right front load and the left front load and the subtraction of the right rear load and the left rear load result in one positive number and one negative number.

3. The seating condition detecting system according to claim 1, wherein:

the difference between the right front load and the left front load is calculated by subtracting the left front load from the right front load;

the difference between the right rear load and the left rear load is calculated by subtracting the left rear load from the right rear load; and the self-diagnostic means determines the abnormal operation when the result of the subtraction between the right front load and the left front load is larger than zero and the result of the subtraction between the right rear load and the left rear load is smaller than zero.

4. The seating condition detecting system according to claim 1, wherein:

the difference between the right front load and the left front load is calculated by subtracting the left front load from the right front load;

the difference between the right rear load and the left rear load is calculated by subtracting the left rear load from the right rear load; and the self-diagnostic means determines the abnormal operation when the result of the subtraction between the right front load and the left front load is smaller than zero and the result of the subtraction between the right rear load and the left rear load is larger than zero.

5. The seating condition detecting system according to claim 1, wherein:

the difference between the right front load and the right rear load is calculated by a subtraction between the right front load and the right rear load;

the difference between the left front load and the left rear load is calculated by a subtraction between the left front load and the left rear load; and the self-diagnostic means determines the abnormal operation when results of the subtraction of the right front load and the right rear load and the subtraction of the left front load and the left rear load results in one positive number and one negative number.

6. The seating condition detecting system according to claim 1, wherein:

the difference between the right front load and the right rear load is calculated by subtracting the right rear load from the right front load;

the difference between the left front load and the left rear load is calculated by subtracting the left rear load from the left front load; and the self-diagnostic means determines the abnormal operation when the result of the subtraction between the right front load and right rear load is larger than zero and the result of the subtraction between the left front load and left rear load is smaller than zero.

7. The seating condition detecting system according to claim 1, wherein:

the difference between the right front load and the right rear load is calculated by subtracting the right rear load from the right front load;

the difference between the left front load and the left rear load is calculated by subtracting the left rear load from the left front load; and the self-diagnostic means determines the abnormal operation when the result of the subtraction between the right front load and right rear load is smaller than zero and the result of the subtraction between the left front load and left rear load is larger than zero.

8. A seating condition detecting system comprising:

a first load sensor for detecting a load to which a first elastic body that supports a first part of a seat from underneath is subjected;

a second load sensor for detecting a load to which a second elastic body that supports a second part of the seat from underneath is subjected;

a third load sensor for detecting a load to which a third elastic body that supports a third part of the seat from underneath is subjected;

a fourth sensor for detecting a load to which a fourth elastic body that supports a fourth part of the seat from underneath is subjected;

a seating condition detector for detecting a seating condition of a vehicle occupant based on the loads detected by the load sensors; and a self-diagnostic device for determining an abnormal operation of the load sensors based on calculated differences between the detected loads detected by two of the load sensors and between the detected loads detected by other two load sensors, and based on whether the differences contradict each other.

9. The seating condition detecting system according to claim 8, wherein:

the difference between the loads detected by a first pair of the load sensors is calculated by subtracting one of the loads from another;

the difference between the loads detected by a second pair of the load sensors is calculated by subtracting one of the loads from another;

loads from which other loads are subtracted are detected by ones of the load sensors located on one side of the seat;

the other loads are detected by ones of the load sensors located on another side of the seat; and the self-diagnostic device determines the abnormal operation when results of calculations of the difference between the detected loads detected by the first pair of the load sensors and the difference between the detected loads detected by the second pair of the load sensors, results in one positive number and one negative number.

10. A seating condition detecting system comprising:

a right front load sensor for detecting a load to which a right front elastic body that supports a right front part of a seat from underneath is subjected;

a left front load sensor for detecting a load to which a left front elastic body that supports a left front part of the seat from underneath is subjected;

a right rear load sensor for detecting a load to which a right rear elastic body that supports a right rear part of the seat from underneath is subjected;

a left rear load sensor for detecting a load to which a left rear elastic body that supports a left rear part of the seat from underneath is subjected;

an electronic control unit connected to the right front load sensor, the left front load sensor, the right rear load sensor and the left rear load sensor, for performing a predetermined operation and determination based on signals from the load sensors, wherein:

the electronic control unit includes a seating condition detector for detecting a seating condition of a vehicle occupant based on the loads detected by the load sensors, and a self-diagnostic device connected to the seating condition detector to detect an abnormal operation of the load sensors; and the self-diagnostic device includes calculating means for calculating a first difference between the detected right front load and the detected left front load, and a second difference between the detected right rear load and the detected left rear load, the first and second differences indicating a seating position of the vehicular occupant that is either rightward or leftward, and determining means for determining whether the first and second differences contradict each other.

11. A seating condition detecting system comprising:

a right front load sensor for detecting a load to which a right front elastic body that supports a right front part of a seat from underneath is subjected;

a left front load sensor for detecting a load to which a left front elastic body that supports a left front part of the seat from underneath is subjected;

a right rear load sensor for detecting a load to which a right rear elastic body that supports a right rear part of the seat from underneath is subjected;

a left rear load sensor for detecting a load to which a left rear elastic body that supports a left rear part of the seat from underneath is subjected;

an electronic control unit connected to the right front load sensor, the left front load sensor, the right rear load sensor and the left rear load sensor, for performing a predetermined operation and determination based on signals from the load sensors, wherein:

the electronic control unit includes a seating condition detector for detecting a seating condition of a vehicle occupant based on the loads detected by the load sensors, and a self-diagnostic device connected to the seating condition detector to detect an abnormal operation of the load sensors; and the self-diagnostic device includes calculating means for calculating a first difference between the detected right front load and the detected right rear load, and a second difference between the detected left front load and the detected left rear load, the first and second differences indicating seating position of the vehicular occupant either forward or backward, and determining means for determining whether the first and second differences contradict each other.

* * * * *